(12) United States Patent
Beckers et al.

(10) Patent No.: US 11,035,805 B2
(45) Date of Patent: Jun. 15, 2021

(54) X-RAY ANALYSIS APPARATUS AND METHOD

(71) Applicant: Malvern Panalytical B.V., Almelo (NL)

(72) Inventors: Detlef Beckers, Almelo (NL); Milen Gateshki, Almelo (NL); Jaap Boksem, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 0 days.

(21) Appl. No.: 16/382,562

(22) Filed: Apr. 12, 2019

(65) Prior Publication Data

US 2019/0317030 A1 Oct. 17, 2019

(30) Foreign Application Priority Data

Apr. 13, 2018 (EP) ...................................... 18167396
Apr. 13, 2018 (EP) ...................................... 18167398
Dec. 17, 2018 (EP) ...................................... 18213033

(51) Int. Cl.
*G01N 23/20008* (2018.01)
*G01N 23/201* (2018.01)
*G01N 23/207* (2018.01)
*G01N 23/2055* (2018.01)
*G01N 23/20* (2018.01)

(52) U.S. Cl.
CPC ....... *G01N 23/20008* (2013.01); *G01N 23/20* (2013.01); *G01N 23/201* (2013.01); *G01N 23/207* (2013.01); *G01N 23/2055* (2013.01); *G01N 2223/316* (2013.01)

(58) Field of Classification Search
CPC ........... G01N 23/20008; G01N 23/201; G01N 23/20; G01N 23/2055; G01N 23/207; G01N 2223/316
See application file for complete search history.

(56) References Cited

U.S. PATENT DOCUMENTS

| | | | |
|---|---|---|---|
| 2004/0066903 A1* | 4/2004 | Fujinawa | G01N 23/201 378/145 |
| 2008/0095318 A1* | 4/2008 | Kantonen | G21K 1/067 378/147 |

(Continued)

*Primary Examiner* — Chih-Cheng Kao
(74) *Attorney, Agent, or Firm* — Leason Ellis LLP

(57) ABSTRACT

An X-ray analysis apparatus comprises an X-ray source configured to irradiate a sample with an incident X-ray beam. A first beam mask component is arranged between the X-ray source and the sample. The first beam mask component has a first opening for limiting the size of the incident X-ray beam. When the first beam mask component is in a first configuration, the first opening is arranged in the incident X-ray beam. The first beam mask component further comprises a second opening. When the first beam mask component is in a second configuration, the second opening is arranged in the incident X-ray beam. The second opening does not limit the size of the incident X-ray beam. A controller is configured to control a first beam mask component actuator to change the configuration of the first beam mask component between the first configuration and the second configuration by moving the first beam mask component in a plane intersected by the incident X-ray beam.

23 Claims, 7 Drawing Sheets

(56) References Cited

U.S. PATENT DOCUMENTS

| | | | |
|---|---|---|---|
| 2009/0103686 A1* | 4/2009 | Rothschild | G21K 1/043 378/160 |
| 2013/0272497 A1* | 10/2013 | Goto | G21K 1/025 378/45 |
| 2014/0249663 A1* | 9/2014 | Voillaume | G01N 23/043 700/109 |
| 2018/0303440 A1* | 10/2018 | Sung | A61B 6/06 |

* cited by examiner

X-RAY ANALYSIS APPARATUS AND METHOD

CROSS-REFERENCE TO RELATED PATENT APPLICATIONS

The present application claims priority under 35 U.S.C. § 119 to European Patent Application No. 18167398.9, filed Apr. 13, 2018, European Patent Application No. 18167396.3, filed Apr. 13, 2018, and European Patent Application No. 18213033.6, filed Dec. 17, 2018, all of which are incorporated by reference, as if expressly set forth in their respective entireties herein.

FIELD OF THE INVENTION

This invention relates to an X-ray analysis apparatus and a method of using an X-ray analysis apparatus. More particularly, this invention relates to an X-ray analysis apparatus for use in multiple applications.

BACKGROUND OF THE INVENTION

X-ray analysis is a method for characterising material samples. Some X-ray analysis methods are X-ray diffraction methods, for example the Bragg Brentano method, Grazing Incidence X-ray Diffraction (GIXRD) and X-ray microdiffraction. Other X-ray analysis methods include Small Angle X-ray Scattering (SAXS), Grazing Incidence Small Angle X-ray Scattering (GISAXS), and X-ray Reflectometry.

In general, an X-ray measurement is carried out by directing X-rays from an X-ray source onto a sample along an incident X-ray beam path. X-rays are scattered or diffracted by the sample. An X-ray detector detects at least some of the scattered or diffracted X-rays.

X-rays optics such as divergence slits, anti-scatter slits and collimators may be provided on the incident and/or diffracted/scattered beam side.

In addition, X-ray measurements are often carried out on a batch of samples. Different samples in the batch of samples may have different properties (in terms of material, shape and/or size). Accordingly, the optimal X-ray analysis apparatus set-up may vary between samples.

In order to use an X-ray analysis apparatus for carrying out different measurements using different X-ray analysis methods, users must reconfigure the X-ray analysis apparatus. This requires expertise. Further, reconfiguring the X-ray equipment is both inconvenient and time consuming.

In addition, to obtain high quality results it is desirable to minimise the signal from X-rays scattered by the X-ray analysis apparatus.

It would accordingly be desirable to provide an X-ray apparatus that is capable of delivering high quality measurements. In particular, it would be desirable to provide an X-ray apparatus that is capable of delivering high quality measurements for multiple different applications.

SUMMARY OF THE INVENTION

The invention is defined by the claims. According to an aspect of the invention, there is provided an X-ray analysis apparatus comprising:
an X-ray source for generating X-rays;
a sample stage configured to support a sample, the X-ray source and the sample stage being arranged so that X-rays generated by the X-ray source define an incident X-ray beam that irradiates the sample, wherein the incident X-ray beam is directed from the X-ray source to the sample along an incident X-ray beam path;
a first beam mask component arranged between the X-ray source and the sample, in the incident X-ray beam path, wherein the first beam mask component comprises a body, a first opening for limiting the size and/or divergence of the incident X-ray beam and a second opening;
wherein the first beam mask component has a first configuration and a second configuration, wherein in the first configuration:
  the first opening is arranged in the incident X-ray beam path so as to limit the size and/or divergence of the incident X-ray beam and the second opening is arranged outside of the incident X-ray beam path, and
in the second configuration:
  the second opening is arranged in the incident X-ray beam path, and the body and the first opening are arranged outside of the incident X-ray beam path; and
the X-ray analysis apparatus further comprises a controller configured to control a first beam mask component actuator to change the configuration of the first beam mask component between the first configuration and the second configuration by moving the first beam mask component in a plane intersected by the incident X-ray beam.

The inventors have realised that by providing this arrangement it is possible to conveniently reconfigure the X-ray analysis apparatus, by replacing the opening arranged in the incident X-ray beam path with a different opening, without user intervention. The apparatus can therefore be used for X-ray analysis techniques that have different beam collimation or beam size requirements.

In the first configuration, the first opening limits the size and/or divergence of the incident X-ray beam. Preferably, in the second configuration, neither the first opening nor the second opening limits the size of the incident X-ray beam. The second opening is preferably sufficiently large that even when the second opening is arranged in the incident X-ray beam path, it does not limit the size of the incident X-ray beam.

Preferably, the X-ray source has a line focus. When the second opening is in the incident X-ray beam path, X-rays from across the entire length of the line focus are incident on the sample since they pass through the second opening, uninterrupted by the first beam mask component. Preferably, when the first opening is in the incident X-ray beam path, only part of the X-ray beam from the line focus passes through the first beam mask component. The first opening is preferably a slit aperture.

In some embodiments, the plane intersected by the incident X-ray beam is a plane orthogonal to the incident X-ray beam.

The X-ray analysis apparatus may further comprise:
a second beam mask component arranged between the first beam mask component and the sample, the second beam mask component comprising a body, a first opening for limiting the size and/or divergence of the incident X-ray beam and a second opening;
the second beam mask component having a first configuration and a second configuration, wherein in the first configuration:
  the first opening is arranged in the incident X-ray beam path and the second opening is arranged outside of the incident X-ray beam path, and in the second configuration:

the second opening is arranged in the incident X-ray beam path, and the body and the first opening are arranged outside of the incident X-ray beam path; and wherein the controller is configured to control a second beam mask component actuator to change the configuration of the second beam mask component between the first configuration and the second configuration by moving the second beam mask component in a plane intersected by the incident X-ray beam.

When the second beam mask component is in the first configuration, the first opening limits the size and/or divergence of the incident X-ray beam. In the first configuration, the second opening is positioned outside of the incident X-ray beam path and does not limit the divergence of the incident X-ray beam.

Preferably, when the second beam mask component is in the second configuration, neither the first opening nor the second opening limits the divergence of the incident X-ray beam. The second opening is sufficiently large that even when the second opening is arranged in the incident X-ray beam path, it does not limit the divergence of the incident X-ray beam.

The first beam mask component and the second beam mask component may at least partly determine the size and shape of the X-ray beam incident on the sample.

The first opening is arranged to reduce the size of the X-ray beam.

In some embodiments, the plane intersected by the incident X-ray beam is a plane orthogonal to the incident X-ray beam.

The controller may be configured to control the first beam mask component actuator and the second beam mask component actuator to move the first beam mask component and the second beam mask component respectively between any two of a first measurement mode, a second measurement mode, a third measurement mode and a fourth measurement mode, wherein:

in the first measurement mode, the first beam mask component is in the first configuration and the second beam mask component is in the first configuration;

in the second measurement mode, the first beam mask component is in the first configuration and the second beam mask component is in the second configuration; and in the third measurement mode, the first beam mask component is in the second configuration and the second beam mask component is in the second configuration; and in a fourth measurement mode, the first beam mask component is in the second configuration and the second beam mask component is in the first configuration.

When the first beam mask component is in the first configuration and the second beam mask component is in the first configuration, the first opening of the first beam mask component and the first opening of the second beam mask component limit the divergence of the incident X-ray beam. Therefore, the X-ray beam from the second beam mask component to the sample can be small and well defined. The X-ray analysis apparatus can therefore be used for applications such as microdiffraction, small spot stress analysis or small spot texture analysis. In addition, the first measurement mode can be used for aligning the sample.

When the first beam mask component is in the first configuration and the second beam mask component is in the second configuration, the first beam mask component reduces the size of the incident X-ray beam and the second beam mask component does not. In this measurement mode, the X-ray analysis apparatus can be used for topography measurements.

When the first beam mask component is in the second configuration and the second beam mask component is in the second configuration, the X-ray analysis apparatus can be used for thin film phase analysis measurements, powder diffraction measurements (Bragg Brentano) or reflectivity measurements. Preferably, the X-ray source generates a line focus. Because the controller controls the position of the first beam mask component and the second beam mask component, it can control the X-ray apparatus to take measurements in different measurement modes.

In some embodiments, the controller can control the apparatus to measure a sample using two different measurement modes. For example, the controller may cause the apparatus to carry out a first measurement in the first measurement mode then carry out a second measurement in the third measurement mode or the fourth measurement mode. In this way, two different types of X-ray analysis techniques can be used on the same sample, without the need for extensive re-alignment of the X-ray analysis apparatus by an expert user.

In some embodiments, the controller can control the apparatus to measure different samples in a batch of samples in different modes. For example, some samples in the batch can be measured by carrying out a first set of measurements in the first measurement mode. After the first set of measurements has been carried out, a second set of measurements can be carried out by measuring other samples in the batch using the third measurement mode. In this example, the configuration of the first beam mask component and the second beam mask component is changed after the first set of measurements and before the second set of measurements.

In some embodiments, the X-ray analysis apparatus comprises a goniometer and the X-ray source is mounted to the goniometer so as to be rotatable about an axis of the goniometer, to irradiate the sample at a range of different incident angles.

In some embodiments, the controller is configured to calculate a parameter relating to a dimension of the sample and to change the configuration of the first beam mask component and/or the second beam mask component based on the calculated parameter.

In some embodiments, the parameter is an amount by which the sample extends, in a direction perpendicular to the direction of the incident X-ray beam.

In some embodiments, the parameter is the width of the sample. The width of the sample is the dimension of the sample that extends in an axial direction i.e. in the direction of the axis of rotation of the goniometer, about which the detector can rotate.

In some embodiments, the parameter is the length of the sample. The length of the sample is a dimension of the sample that extends in a direction perpendicular to the width of the sample, and a thickness of the sample.

By obtaining information about the sample in this way, it is possible to align the sample more accurately with respect to the incident X-ray beam. By aligning the sample more accurately, it is possible to maximise the amount of the incident X-ray beam that is incident on the sample and to minimise the amount of the incident X-ray beam that is incident on the sample stage. In this way, intensity is maximised and parasitic scatter from the sample holder is minimised. Accordingly, high quality measurements can be made.

It is also possible to use the magnitude of the parameter to determine which opening of the first beam mask component and/or the second beam mask component is optimal for measuring the sample. By selecting a configuration of the first and/or second beam mask component based on the size of the sample, it is possible to minimise parasitic scatter from the sample stage. If the opening is too large, the incident X-ray beam will irradiate both the sample and the sample stage; this results in parasitic scatter. If the opening is too small, the intensity of the incident X-ray beam is not optimal. By optimising the size of the opening, it is possible to improve measurement quality, for example by maximising intensity and minimising parasitic scatter.

The X-ray analysis apparatus may further comprise an X-ray detector, and the controller may be configured to carry out a parameter calculation procedure to calculate a first dimension of the sample by:

controlling the X-ray analysis apparatus to move the sample relative to the incident X-ray beam;

detecting a first edge of the sample by detecting a first change in the intensity of the X-rays;

detecting a second edge of the sample by detecting a second change in the intensity of X-rays;

calculating the first dimension of the sample by calculating the distance between the first edge and the second edge. The sample is moved relative to the incident X-ray beam, preferably in a direction parallel to the first dimension. In some embodiments, the first edge and the second edge are detected by measuring the intensity of X-rays scattered by the sample (that is, the X-rays from the sample). In other embodiments, the first edge and the second edge are detected using the shadow of the sample. By detecting the positions at which a change in X-ray intensity occurs, it is possible to locate the edges of the sample. By calculating the distance between two edges of the sample, it is possible to calculate the width or the length of the sample.

The edges of the sample are on the perimeter of the surface of the sample irradiated by the X-ray beam. The first edge is on an opposite side of the sample surface to the second edge. The first dimension of the sample is the distance between the first edge and the second edge. For example, if the perimeter of the sample surface is rectangular, the first dimension is the distance between two opposite sides of the rectangle (i.e. the width or the length of the rectangle). In some embodiments, the controller may be configured to calculate both the width and the length of the sample. Alternatively, if the perimeter of the surface is elliptic e.g. round or oval, the controller may be configured to determine a parameter relating to the size of the surface such as the diameter, the length of the major axis or the length of the minor axis.

In some embodiments, the controller is configured to move the sample stage in order to move the sample relative to the incident X-ray beam.

The sample is moved relative to the incident X-ray beam, to multiple measurement positions. At some measurement positions, the incident X-ray beam irradiates a relatively large part of the sample. In embodiments in which the edges are detected by measuring the intensity of X-rays scattered by the sample the intensity of the detected X-rays is relatively high at these measurement positions. At other measurement positions, the incident X-ray beam irradiates a relatively small part of the sample or does not irradiate the sample. In embodiments in which the edges are detected by measuring the intensity of X-rays scattered by the sample, the intensity of the detected X-rays is relatively low at these measurement positions.

In some embodiments, the controller can control the configuration of the first beam mask component and optionally the second beam mask component based on the calculated dimension of the sample.

The controller may be configured to control the first beam mask component actuator to move the first beam mask component to the first configuration before carrying out the parameter calculation procedure and to control the second beam mask component actuator to move the second beam mask component to the first configuration before carrying out the parameter calculation procedure.

By using both the first opening of the first beam mask component and the first opening of the second beam mask component to limit the divergence of the incident X-ray beam during the parameter calculation procedure, the X-ray beam incident on the sample is small and well defined, so that it is possible to measure the size of the sample more accurately.

The controller may be configured to:

control the first beam mask component actuator to move the first beam mask component to the second configuration after carrying out the parameter calculation procedure; and preferably control the second beam mask component actuator to move the second beam mask component to the second configuration after carrying out the parameter calculation procedure.

In this way, the X-ray analysis apparatus is automatically configured to carry out a parameter measurement procedure.

The X-ray analysis apparatus may further comprise a camera arranged to image the sample, wherein the controller is configured to:

control the camera to take an image of the sample; and analyse the image of the sample to calculate a dimension of the sample.

The controller may be configured to calculate the width or the length of the sample from an image obtained by the camera. The controller may be configured to determine whether the sample is aligned with the X-ray beam. The controller may analyse the image of the sample to identify the centre of the sample surface. For optimal sample alignment, the sample should be positioned with respect to the X-ray beam so that the axis of the X-ray beam passes through the centre of the sample surface (that is, the axis of the X-ray beam when the X-ray apparatus is arranged in the first measurement mode passes through the centre of the sample surface).

The controller may be configured to determine the shape of the sample, based on the image obtained by the camera.

In some embodiments, the controller is configured to calculate the size of a dimension of the sample using only the image of the sample obtained by the camera.

In some embodiments, the controller uses the dimension calculated during the parameter calculation procedure as well as the image obtained by the sample to calculate the size of the sample.

The X-ray analysis apparatus may comprise an X-ray detector arranged to receive X-rays from the sample and an adjustable slit arranged between the sample and the X-ray detector, wherein the controller is configured to control the opening of the adjustable slit.

In embodiments, the X-ray detector is the same X-ray detector used to carry out the parameter calculation procedure. The X-ray analysis preferably further comprises a parallel plate collimator arranged between the X-ray detector and the sample.

The X-ray analysis apparatus may further comprise an adjustable divergence slit for limiting the divergence of the incident X-ray beam, wherein the adjustable divergence slit is arranged in the incident X-ray beam path, and wherein the controller is configured to control the opening of the adjustable divergence slit.

The adjustable divergence slit is configured to limit the equatorial divergence of the incident X-ray beam.

The controller may be configured to carrying out a second parameter measurement procedure to calculate a second dimension of the sample, wherein the second parameter measurement procedure comprises:

controlling the X-ray analysis apparatus to rotate the sample from a first position to a second position;

controlling the X-ray analysis apparatus to move the sample relative to the incident X-ray beam, in a direction substantially parallel to the second dimension;

detecting a third edge of the sample by detecting a first change in the intensity of X-rays;

detecting a fourth edge of the sample by detecting a second change in the intensity of X-rays;

calculating the second dimension of the sample by calculating the distance between the third edge and the fourth edge;

controlling the X-ray analysis apparatus to rotate the sample from the second position to the first position.

The sample is rotated in a plane that contains the first dimension and the second dimension. By rotating the sample, then carrying out the parameter measurement procedure, it is possible to measure another dimension of the sample. Preferably the sample is rotated by 80 to 100 degrees, more preferably by 90 degrees. The sample is rotated in the plane defined by the first dimension and the second dimension.

The edges of the sample are on the perimeter of the surface of the sample irradiated by the X-ray beam. The third edge is on an opposite side of the sample surface to the fourth edge. For example, if the sample is rectangular, the four edges of the sample are the four sides of the rectangle. In some embodiments, the edges of the sample are the corners of the sample. In this case, the second edge and the third edge may refer to the same corner.

The controller may be configured to control the opening of the adjustable slit based on the dimension of the sample calculated by the controller.

The first beam mask component may be moveable between the first configuration and the second configuration by rotating the first beam mask component and preferably the second beam mask component is moveable between the first configuration and the second configuration by rotating the second beam mask component.

Preferably the first beam mask component and optionally the second beam mask component are arranged to be rotatable in a plane substantially perpendicular to the incident X-ray beam. The first beam mask component may be rotatable about an axis that extends through it and is perpendicular to a major surface of the first beam mask component. The second beam mask component may be rotatable about an axis that extends through it and is perpendicular to a major surface of the second beam mask component.

The first beam mask component may comprise at least two openings for limiting the size and/or divergence of the incident X-ray beam and optionally the second beam mask component may comprise at least two openings for limiting the size and/or divergence of the incident X-ray beam.

The controller may be configured to calculate a parameter relating to a dimension of the sample and to change the configuration of the first beam mask component and/or the second beam mask component based on the calculated parameter.

In addition to the first opening, the first beam mask component comprises at least one additional opening for limiting the divergence of the incident X-ray beam. The first beam mask component therefore comprises at least three openings; the first opening, the second opening and a third opening. The third opening is suitable for limiting the divergence of the incident X-ray beam. The third opening may be a slit opening or an aperture for creating a point focus. The first beam mask component has a third configuration, in which the third opening is arranged in the incident X-ray beam path to limit the divergence of the incident X-ray beam. The different openings have different widths and/or lengths.

The second beam mask component may also comprise at least one additional opening for limiting the divergence of the incident X-ray beam. Therefore, in some embodiments, the second beam mask component comprises at least three openings; the first opening, the second opening and a third opening. The third opening is suitable for limiting the divergence of the incident X-ray beam. The additional opening for limiting the divergence of the incident X-ray beam may be a slit opening or an aperture for creating a point focus. The second beam mask component has a third configuration, in which the third opening is arranged in the incident X-ray beam path to limit the divergence of the incident X-ray beam. The different openings have different widths and/or lengths.

The controller may be configured to determine whether the first opening or the second opening is optimal for carrying out a particular X-ray analysis measurement, based on the measured size (that is the width, or the length) of the sample.

The X-ray analysis apparatus provides even greater flexibility since more combinations of openings can be arranged in in the incident X-ray beam path.

The first beam mask component and/or the second beam mask component may be arranged to move in a plane substantially perpendicular to the incident X-ray beam.

Substantially perpendicular means within 30 degrees of perpendicular, and preferably within 10 degrees of perpendicular.

According to an aspect of the invention, there is provided a method of using the X-ray analysis apparatus described above, comprising carrying out a parameter calculation procedure by:

moving the sample relative to the incident X-ray beam;

detecting a first edge of the sample by detecting a first change in the intensity of X-rays;

detecting a second edge of the sample by detecting a second change in the intensity of X-rays;

calculating a dimension of the sample by calculating the distance between the first edge and the second edge.

The parameter is a dimension of the sample. For example, the width or the length of the sample surface, or the diameter of the sample surface. By calculating the position of the edges of the sample, the sample can be conveniently aligned with the X-ray source, to optimise the quality of the measurements taken with the X-ray analysis apparatus.

A change in intensity of X-rays detected by the detector following a change in the relative position of the sample and the X-ray source indicates that at least part of the incident X-ray beam that was previously irradiating the sample is no longer incident on the sample or that a part of the incident X-ray beam that was not previously irradiating the sample is now incident on the sample. For example, if the incident X-ray beam does not irradiate the sample at the first position and fully irradiates the sample at the second position, the intensity of detected X-rays may increase when the sample is moved from the first position to the second position.

In some embodiments, to carry out the parameter calculation procedure, one opening for limiting the divergence of the incident X-ray beam is arranged in the incident X-ray beam.

The method may comprise, after carrying out the parameter calculation procedure, positioning the second beam mask component in the second configuration.

After the sample has been aligned, the first beam mask component is moved to the second configuration, so that the first beam mask component does not limit the divergence of the incident X-ray beam. In this configuration, X-ray analysis measurements such as powder diffraction measurements, reflectivity measurements or thin film phase analysis measurements can be carried out.

The method may further comprise, after carrying out the parameter calculation procedure, selecting a first beam mask component configuration based on the calculated parameter and positioning the first beam mask component in the selected configuration, and preferably selecting a second beam mask component configuration based on the parameter and positioning the second beam mask component in the selected configuration.

The first beam mask component comprises a plurality of openings having different sizes to one another. By measuring a dimension of the sample in a direction perpendicular to the incident X-ray beam, it is possible to choose an opening that has a size that is optimal for the size of the sample, and arrange that slit in the incident X-ray beam path. By choosing an opening that limits the width of the beam that irradiates the sample to a width close to the width of the sample, it is possible to reduce and/or avoid background scattering from the sample stage whilst maximising intensity. The X-ray analysis apparatus can therefore be used to obtain high quality results for a variety of sample sizes.

The method may further comprise controlling the X-ray analysis apparatus to adjust the opening of the adjustable slit, based on the second dimension calculated by the controller.

By adjusting the opening of the adjustable slit based on the second parameter, it is possible to select only X-rays from the sample.

The method may further comprise controlling the X-ray analysis apparatus to adjust the opening of the adjustable divergence slit, based on the first dimension and/or the second dimension calculated by the controller.

By adjusting the opening of the adjustable divergence slit based on the second parameter, it is possible to control the irradiated area of the sample. The controller can be configured to cause the X-ray analysis apparatus to carry out any of the method steps discussed above.

According to an aspect of the invention, there is provided a computer program comprising computer program code configured to cause a controller of an X-ray analysis apparatus to carry out all the steps of the method according to any one of methods above when said computer program is run on said controller. The computer program may be embodied on a non-transitory computer-readable medium.

BRIEF DESCRIPTION OF THE DRAWINGS

Embodiments of the invention will now be described, by way of example, with reference to the accompanying drawings, in which:

FIG. 5b illustrates the sample, irradiated by the incident X-ray beam during the method of FIG. 5a.

Figure 1:
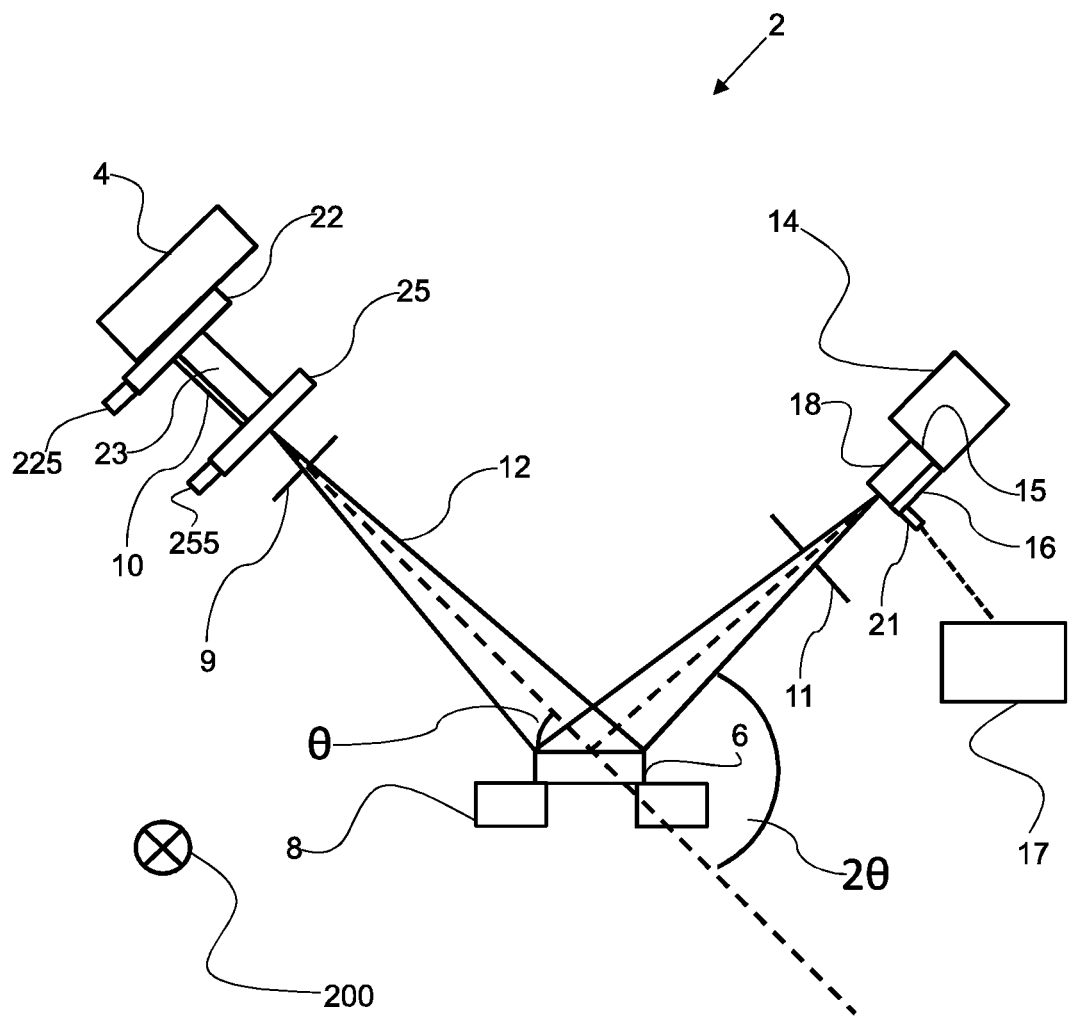
FIG. 1 shows an X-ray analysis apparatus, according to an embodiment of the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Referring to FIG. 1, the X-ray analysis apparatus 2 is arranged for making an X-ray diffraction measurement. The X-ray analysis apparatus 2 includes an X-ray source (X-ray tube 4) configured to generate X-rays and a sample stage 8 for supporting a sample 6. The X-ray tube 4 and the sample stage 8 are configured so that X-rays generated by the X-ray tube 4 define an incident X-ray beam 12 that irradiates the sample 6. The X-ray tube 4 has a line focus. The line focus extends into the plane of the page.

The X-ray tube 4 is arranged to direct X-rays towards the sample 6 at an incident angle, $\theta$. The incident X-rays are diffracted by the sample 6. An X-ray detector 14 is arranged to receive X-rays from the sample 6 that have been diffracted at an angle 20 to the incident X-rays. The X-ray detector 14 and the X-ray tube 4 are mounted to a goniometer (not shown). The angle ($\theta$) of the incident X-ray beam relative to the surface of the sample is changed by changing the orientation of the X-ray tube 4 or the sample 6.

The X-ray detector 14 has a detection region 15 for receiving X-rays from the sample 6. The X-ray detector 14 can be operated in a 2D mode, a 1D mode or a 0D mode, by selecting which parts of the detection region 15 are read out or how the detection region is read out. For Bragg Brentano measurements, the 1D mode can be used.

A first collimator 18 is arranged between the sample stage 8 and the X-ray detector 14. The first collimator is mounted to a first support component 16 for holding at least one collimator. A second collimator 20 (see FIG. 2, FIG. 3) is also mounted to the first support component 16, and is arranged next to the first collimator 18. The first collimator and the second collimator are Soller slit collimators for limiting the axial divergence of the X-ray beam. In FIG. 1, the first collimator is arranged in a first configuration, in which the first collimator 18 is arranged in the diffracted X-ray beam path. The second collimator 20 is arranged in a second configuration. That is, the second collimator is arranged outside of the diffracted X-ray beam path. By moving the first collimator and the second collimator, it is possible to change the configuration of each of the collimators. For example, it is possible to replace the first collimator 18 (which is arranged the diffracted X-ray beam) with the second collimator 20. The first collimator 18 and the second collimator 20 are rigidly fixed to each other via the first support component 16. The first actuator arrangement 21 acts on the first support component 16 to move the first collimator 18 and the second collimator 20 together. At any given configuration, at most one of the first collimator 18 and the second collimator 20 can be arranged between the sample 6 and the X-ray detector 14, in the diffracted X-ray beam path, so as to receive X-rays diffracted by the sample at an angle, 2θ.

The X-ray analysis apparatus 2 further comprises a controller 17, for controlling the configuration of the first collimator 18 and the second collimator 20. The controller 17 is in communication with the first actuator arrangement 21 (as illustrated by the dashed line between the first actuator arrangement 21 and the controller 17). The first actuator arrangement 21 is arranged to change the configuration of each collimator by moving the first collimator 18 and the second collimator 20. The first actuator arrangement 21 comprises a single actuator. Because the first collimator 18 and the second collimator 20 are rigidly fixed to one another the first actuator arrangement 21 can move both collimators at the same time.

In the first configuration, the first collimator 18 is arranged between sample stage 8 and the X-ray detector 14 so as to receive X-rays diffracted by the sample 6. The first collimator 18 is aligned with the detection region 15 of the X-ray detector 14 so that X-rays within the divergence angle of the first collimator 18 pass through the first collimator 18 and are detected by the X-ray detector 14. The second collimator is in the second configuration; that is, the second collimator is arranged outside of the diffracted X-ray beam path. The first collimator 18 and the second collimator 20 are arranged to move laterally in a direction that intersects the X-ray beam from the sample (for example, axially) i.e. in a direction substantially parallel to the axis 200 extending into the plane of the page. The X-ray detector 14 is rotated about the axis of rotation of the goniometer (which is parallel to axis 200) to move between different angles of 2θ.

The first actuator arrangement 21 is arranged to cause the first collimator 18 and the second collimator 20 to move relative to the X-ray detector 14, in an axial direction. In this embodiment, the first actuator arrangement 21 is a linear actuator arrangement comprising a worm drive, which is arranged to cause the first collimator 18 and the second collimator 20 to move linearly, along the axial direction. The first collimator 18 allows beams having an angular divergence within a first range of angles (for example, less than 0.03 radians) to pass through it. The second collimator 20 has an angular divergence that is larger than the first collimator 18 (for example between 0.03 radians and 0.1 radians), and accordingly allows broader beam divergence to pass through it.

The inventors have realised that by providing an arrangement in which the controller 17 can change the configuration of the first and second collimator, so that each collimator can be moved between its first configuration and its second configuration in response to a control signal, it is possible to reconfigure the X-ray analysis apparatus in a convenient way. By changing the configuration of the collimators, it is possible to replace the collimator arranged in the diffracted X-ray beam path with the other collimator.

For example, at the start of an X-ray analysis measurement the first collimator 18 is provided in its first configuration and the second collimator 20 is provided in its second configuration. Accordingly, the first collimator 18 is arranged to receive X-rays diffracted by the sample at an angle 2θ. The first collimator 18 can be exchanged for the second collimator 20 by moving the first collimator 18 to its second configuration and moving the second collimator to its first configuration. The first actuator arrangement 21 moves the first collimator 18 and the second collimator, in response to a control signal from the controller 17.

By providing an arrangement in which the first collimator 18 and the second collimator 20 are arranged to move axially, it is possible to change the collimator configuration without limiting the angular range, 2θ, of the detector 14.

A programmable anti-scatter slit 11 is arranged between the sample 6 and the detector 14. The anti-scatter slit 11 is arranged to reduce the amount of parasitic scatter from the sample stage, or to reduce the amount of other background scatter that reaches the X-ray detector 14. The controller 17 is configured to control the size of the opening of the anti-scatter slit 11.

Turning to the incident beam side of the X-ray analysis apparatus 2, a first beam mask component 22 is arranged between the X-ray tube 4 and the sample 6. A second beam mask component 25 is arranged between the first beam mask component 22 and the sample 6. A beam-conditioning unit 23 is arranged between the first beam mask component 22 and the second beam mask component 25. The beam-conditioning unit 23 comprises a graded multilayer 10 (for example, a flat graded multi-layer) and a Soller slit collimator (not shown). In this embodiment, the beam conditioning unit 23 is configured to be moveable relative to the X-ray tube 4, so that it can be moved in and out of the incident X-ray beam. The controller 17 is configured to control the position of the beam-conditioning unit 23. In other embodiments, the beam conditioning unit is fixed in position. For example, it is fixed relative to the X-ray tube 4.

A programmable divergence slit 9 is arranged in the incident beam, between the beam conditioning unit 23 and the sample 6. The controller 17 is configured to control the size of the opening of the programmable divergence slit. In this way, the size of the slits can be altered depending on the type of measurement being conducted.

The first beam mask component 22 comprises a body 220 which has a plurality of openings formed in it. The first beam mask component 22 is arranged relative to the X-ray tube 4 so that, at any given configuration of the first beam mask component, part of the first beam mask component 22 is arranged in the incident X-ray beam path. If the body 220 of the first beam mask component is arranged in the incident X-ray beam path, it blocks X-rays from the X-ray tube 4 from passing through the first beam mask component 22. If an opening is arranged in the beam path from the focus of the X-ray tube 4 towards sample, at least some of the X-rays from the X-ray tube 4 can pass through the first beam mask component 22 towards the sample 6. A first opening 222 (see FIG. 3) is formed in the body 220 of the first beam mask component 22. The first opening limits the size of the incident X-ray beam from the X-ray tube, since it only allows some of the X-rays from the X-ray tube to pass through the first beam mask component 22 to the sample 6. The first beam mask component 22 comprises a plurality of openings for limiting the size and/or divergence of the incident X-ray beam. When the first beam component is configured such that one of these openings is arranged in the incident X-ray beam path, only some of the X-rays from the X-ray tube 4 can pass through the beam mask component. In this way, the cross section of the beam and/or the divergence of the incident X-ray beam is limited by the opening. When the first beam mask component 22 is in a first configuration, the first opening 222 and part of the body 220 of the beam mask component are arranged in the X-ray beam from the X-ray tube. Accordingly, only some of the X-rays from the X-ray tube 4 pass through the first beam mask component 22 and are incident on the sample 6.

A second opening 224 (see FIG. 3) is also formed in the body 220. When the first beam mask component 22 is in a second configuration, only the second opening 224 is arranged in the incident X-ray beam path. In this configuration, the body 220 of the first beam mask component 22 is arranged outside of the incident X-ray beam path. The second opening 224 is sized so that it does not limit the size or the divergence of the incident X-ray beam when it is arranged in the incident X-ray beam path. Instead, X-rays from the X-ray tube 4 can pass through the second opening 224 of the first beam component 22 without being blocked.

A first beam mask component actuator 225 is configured to move the first beam mask component 22 in order to change the configuration of the first beam mask component 22. The first beam mask component actuator 225 can move the first beam mask component 22 between the first configuration and the second configuration, to control whether the first opening 222 or the second opening 224 is arranged in the incident X-ray beam.

The second beam mask component comprises a body 250. At least two openings are formed in the body 250 (a first opening 252 and a second opening 254). When the second beam mask component 25 is in a first configuration, the first opening 252 is arranged in the incident X-ray beam path. In this configuration, part of the body 250 is also arranged in the incident X-ray beam path, so as to block some of the X-rays from the first beam mask component 22. When the second beam mask component 25 is in a second configuration, the second opening 254 is arranged in the incident X-ray beam path. In this configuration, the body 250 is arranged outside of the incident X-ray beam so that substantially all of the X-rays incident on the second beam mask component 25 from the X-ray tube 4 can pass through the second beam mask component 25, towards the sample.

A second beam mask component actuator 255 is configured to move the second beam mask component 25, to change the configuration of the second beam mask component.

The divergence of the incident X-ray beam can be controlled by providing the first beam mask component in a configuration that limits the size of the incident X-ray beam and by providing the second beam mask component in a configuration that limits the size of the incident X-ray beam. The combination of the two openings limits the divergence of the incident X-ray beam, because only X-rays within a range of angles defined by the size and relative position of the two openings can pass through the first beam mask component and the second beam mask component.

When the second beam mask component 25 is in its second configuration, the second opening 254 is arranged in the incident X-ray beam and the body 250 of the second beam mask component 25 is arranged outside of the incident X-ray beam. Therefore, in the second configuration, the second beam mask component 25 does not block the X-rays from the X-ray source 4.

By providing an arrangement in which the size and/or divergence of the incident X-ray beam can be controlled by changing the configuration of the first and/or second beam mask components, the X-ray analysis apparatus 2 can be used in a flexible and convenient manner.

In particular, by providing both the first beam mask component 22 and the second beam mask component 25, it is possible to provide multiple combinations of openings arranged in the incident X-ray beam. In this way, even more flexibility is provided because the X-ray analysis apparatus can be used for analysis techniques that require a line focus, such as Bragg Brentano measurements, as well as techniques that require a very collimated beam, such as X-ray microdiffraction.

The controller 17 can be configured to automatically select a configuration for the first beam mask component and a configuration for the second beam mask component, in response to a signal indicating the type of measurement to be carried out. In this way, the X-ray analysis apparatus 2 can be configured to carry out a particular X-ray analysis measurement, without the need for intervention by an expert user. In some embodiments, the controller 17 can be configured to change the configuration of the first beam mask component and the second beam mask component after an X-ray analysis measurement has been carried out, so that different analysis techniques can be carried out on a single sample, with minimal or no user intervention. For example, the controller 17 is configured to control the X-ray analysis apparatus to carry out an X-ray analysis measurement on a sample with the first beam mask component 22 and second beam mask component 25 in a first combination of configurations. After the X-ray analysis measurement has been carried out, the controller changes the configuration of the first beam mask component and/or second beam mask component before carrying out a subsequent X-ray analysis measurement on the sample. In this way, the sample can be measured using two different X-ray analysis techniques that use different incident beam types (for example, line collimation or point collimation), with minimal input from the user. Similarly, the controller 17 can be configured to change the configuration of the first beam mask component 22 and the second beam mask component 25 after an X-ray analysis measurement has been carried out, so that different analysis techniques can be carried out for different samples within a batch of samples.

In some embodiments, the controller 17 is in communication with a memory that stores a database containing a list of X-ray analysis techniques. For each analysis technique, there is at least one corresponding measurement mode. The measurement mode indicates an appropriate configuration for the first beam mask component and/or the second beam mask component for each analysis technique. For example, one X-ray analysis technique that could be used is 2D microdiffraction. The associated measurement mode may be a first measurement mode, in which both the first beam mask component 22 and the second beam mask component 25 are in the first configuration.

In a second measurement mode, the first beam mask component is in its first configuration and the second beam mask component is in its second configuration.

Another X-ray analysis technique is Bragg Brentano powder diffraction measurements. The associated measurement mode for this technique is a third measurement mode, in which both the first beam mask component 22 and the second beam mask component 25 are in the second configuration. Alternatively, the Bragg Brentano measurement can be carried out in a fourth measurement mode in which the first beam mask component 22 is in its second configuration and the second beam mask component 25 is in its first configuration.

In some embodiments, the configuration of the first beam mask component and/or the second beam mask component can be changed during the measurement of a single sample.

In some embodiments, an X-ray analysis measurement is carried out on a batch of samples. In this case, the X-ray analysis apparatus 2 comprises a sample holder that is configured to automatically change which sample is arranged in the incident X-ray beam path. In this way, the X-ray analysis apparatus can be arranged differently for different samples in the batch. In particular, the configuration of the first beam mask component and/or the second beam mask component can be changed to use different measurement modes on different samples in a batch of samples that are analysed in an X-ray analysis measurement.

Figure 2:
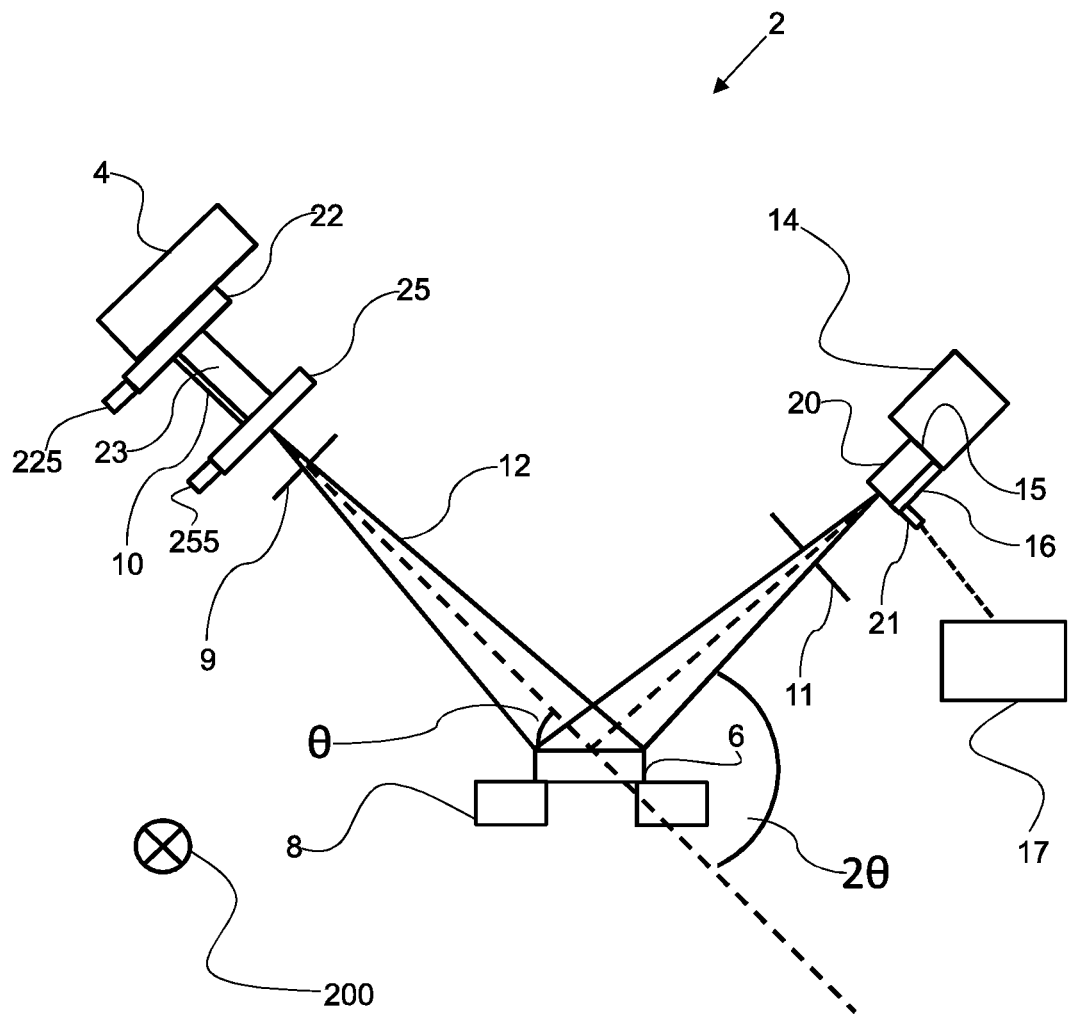
FIG. 2 shows the X-ray analysis apparatus of FIG. 1, with the first collimator and the second collimator in a different configuration.

FIG. 2 illustrates the X-ray analysis apparatus with the first collimator 18 and the second collimator 20 in different configurations to those in FIG. 1. In FIG. 2, the first collimator 18 is in its second configuration (outside of the diffracted X-ray beam) and the second collimator 20 is arranged in its first configuration (in the diffracted X-ay beam). To change the configuration of the first collimator 18 from the first configuration (shown in FIG. 1) to the second configuration (shown in FIG. 2) the first actuator arrangement 21 acts on the first collimator 18 and the second collimator 20 to move them in a direction that intersects the scattered/diffracted/reflected X-ray beam, for example in an axial direction. In an example, the first actuator arrangement 21 moves the first collimator 18 and the second collimator 20 in an axial direction; that is, in a direction extending out of the plane of the page.

The first collimator 18 and the second collimator 20 can also be arranged so that both collimators are in the second configuration. That is, neither the first collimator 18 nor the second collimator 20 is arranged in the diffracted X-ray beam. In this configuration, the X-ray detector 14 receives an X-ray beam diffracted by the sample 6 in a direction towards the detection region 15 of the detector 14, wherein neither the first collimator 18 nor the second collimator 20 interrupts the X-ray beam. Accordingly, the X-ray apparatus 2 provides even greater flexibility since X-ray analysis measurements can be carried out without the first or second collimator in the X-ray beam path.

Furthermore, because the first collimator 18 and the second collimator 20 can be arranged outside of the diffracted X-ray beam path, the X-ray analysis apparatus 2 can be configured for use in X-ray analysis measurements in which no collimator is required. For example, in a GISAXS measurement, it is not usually necessary to collimate the beam scattered by the sample. Accordingly, to carry out a GISAXS measurement, the first and second collimator can be arranged outside of the scattered X-ray beam path (each collimator is arranged in its second configuration). The incident beam is restricted using appropriate beam optics, using the first beam mask component 22 and the second beam mask component 25. The scattered beam is received by the X-ray detector 14, and does not pass through the first collimator 18 or the second collimator 20.

Figure 3:
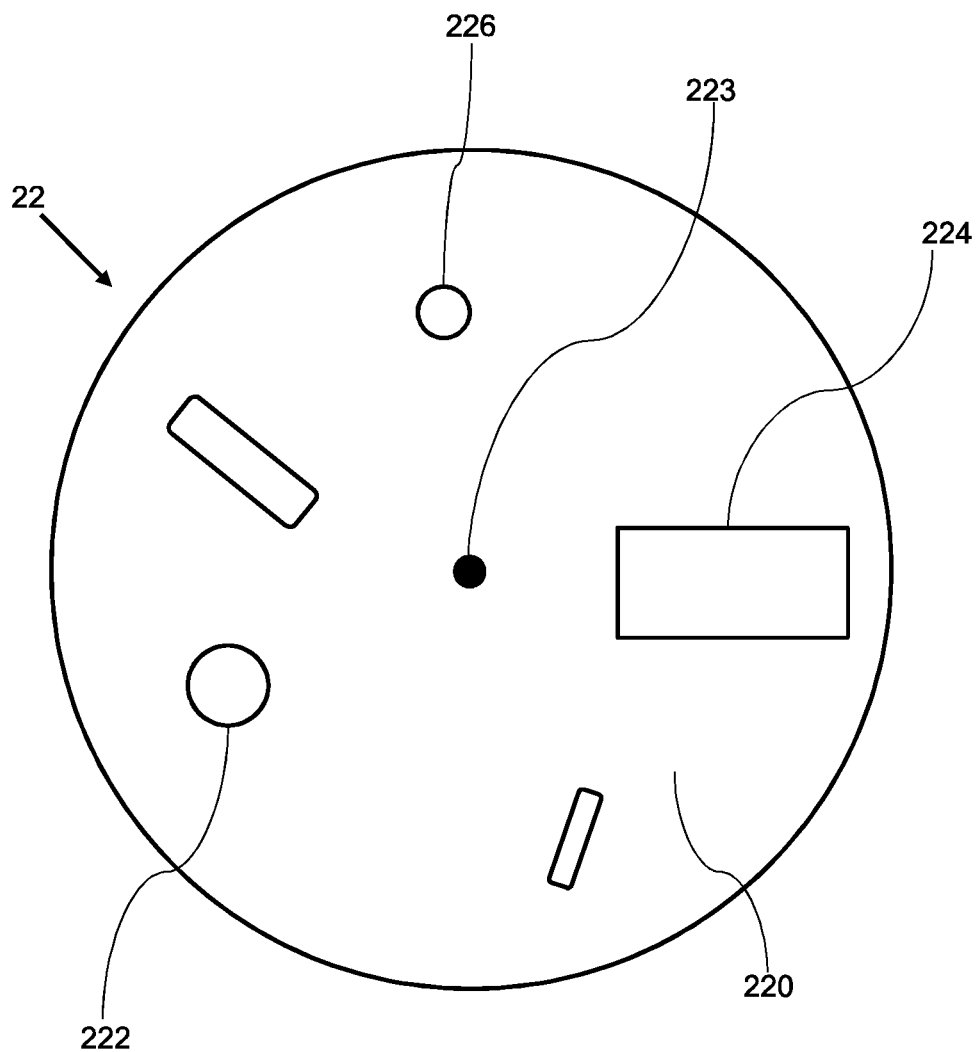
FIG. 3 shows a first beam mask component.

FIG. 3 shows the first beam mask component 22 according to an embodiment of the invention. The first opening 222, which is formed in the body 220, is a first aperture for limiting the size of the incident X-ray beam. The second opening 224 is a relatively large opening that allows X-rays from the line focus of the X-ray tube 4 to pass through without being obstructed. The first beam mask component also comprises a third opening 226, which is another aperture for limiting the size of the incident X-ray beam. The third opening is smaller than the first opening. When the first beam mask component is arranged in a third configuration, the third opening 226 is arranged in the incident X-ray beam path, so as to limit the size of the incident X-ray beam.

The first beam mask component 22 is arranged to be rotatable about its central axis 223, which is perpendicular to the major surface of the first beam mask component. The first beam mask component actuator 225 (see FIG. 1) is configured to rotate the first beam mask component 22 about its axis 223. The first beam mask component 22 is arranged relative to the X-ray tube such that when the first beam mask component 22 is rotated about its axis 223, the part of the first beam mask component 22 arranged in the incident X-ray beam path is changed. That is, by rotating the first beam mask component 22, the configuration of the first beam mask component 22 is changed.

In some embodiments, the first beam mask component 22 further comprises an attenuator portion for reducing the intensity of X-rays that pass through the first beam mask component 22. For example, the first beam mask component 22 can be configured so that the attenuator portion is arranged in the incident X-ray beam path to carry out a SAXS measurement. This configuration can also be used for X-ray reflectometry measurements. For SAXS measurements, the first beam mask component is configured so that the attenuator portion is arranged in the beam for very low angles. After measurements have been carried out at very low angles, the configuration of the first beam mask component is changed. The same applies to Reflectometry measurements. For SAXS measurements, very low angles are, for example, angles of 0.05 degrees to 0.5 degrees. For Reflectometry measurements, very low angles are, for example, angles between 0.05 degrees to 1.5 degrees or between 0.3 degrees and 1.5 degrees.

Figure 4:
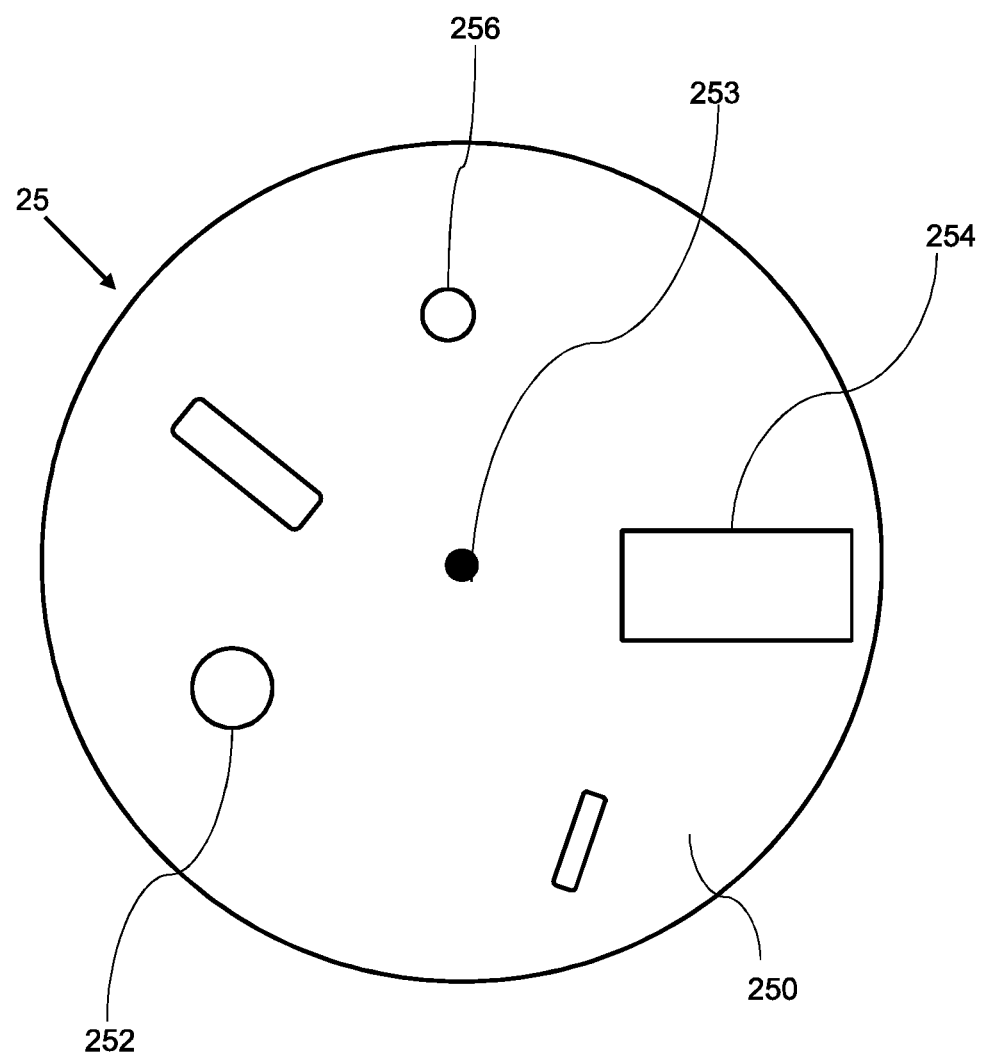
FIG. 4 shows a second beam mask component.

FIG. 4 shows a second beam mask component 25 according to an embodiment of the invention. The second beam mask component 25 has substantially the same structure as the first beam mask component 22. The first opening 252, the second opening 254 and a third opening 256 are formed in the body 250. The second beam mask component is also rotatable about its central axis 253. Accordingly, the second beam mask component actuator 255 can be configured to rotate the second beam mask component about the axis 253 so as to change the configuration of the second beam mask component 25.

Figure 5A:
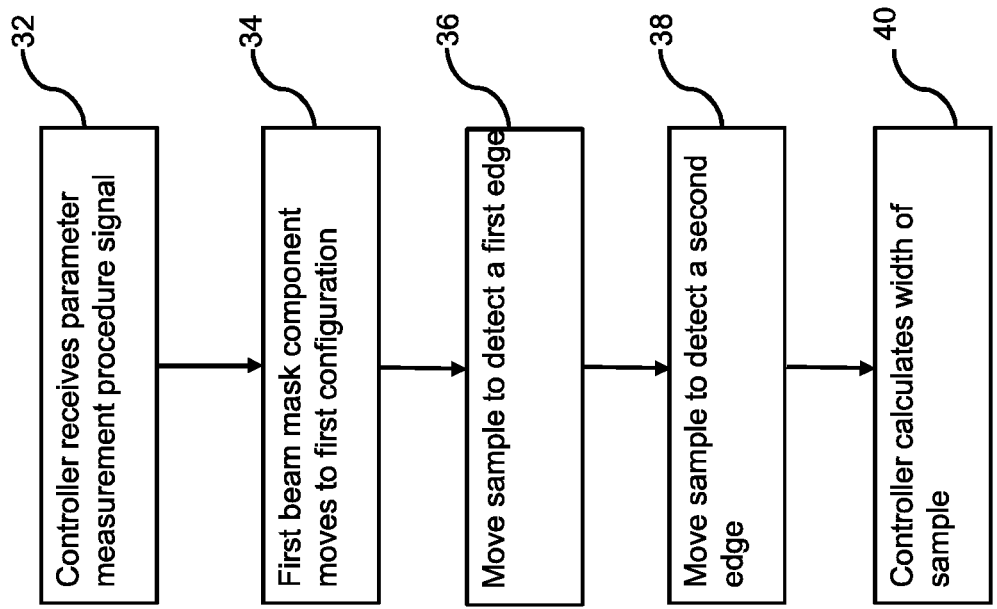
FIG. 5a illustrates a method of using the X-ray analysis apparatus of FIG. 1, according to an embodiment.
Figure 5B:
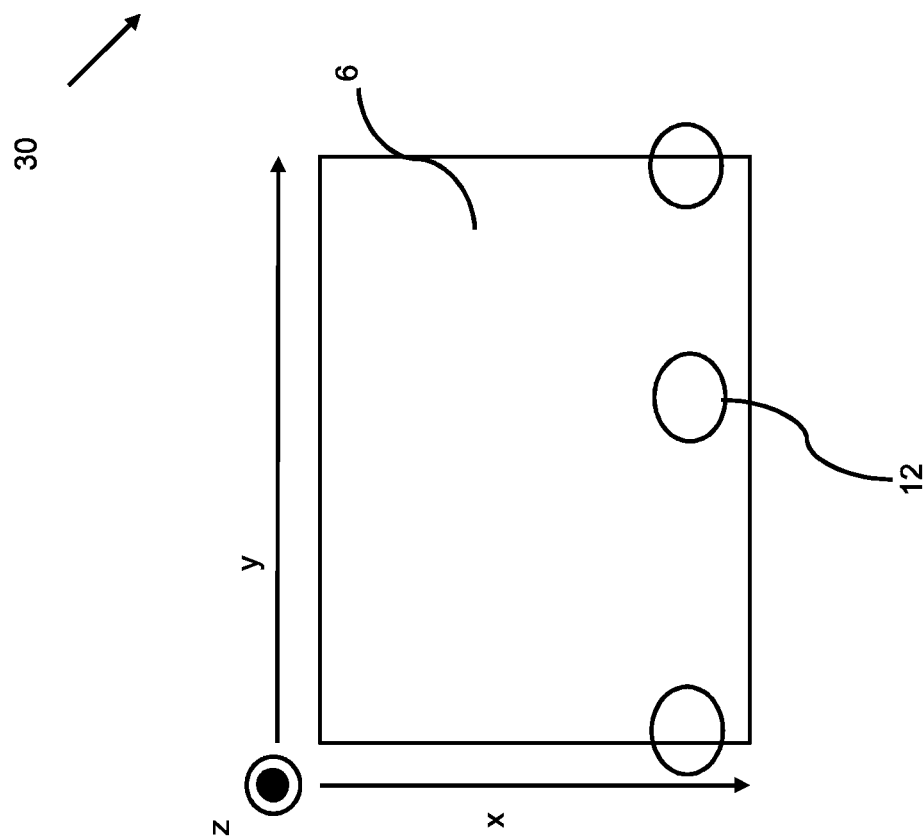

FIG. 5a illustrates a method 30 of using the X-ray analysis apparatus of FIG. 1. FIG. 5b illustrates the sample, with the incident X-ray beam irradiating the sample. The sample has a height (which extends in the z-direction), length (which extends in the x-direction) and width (which extends in the y-direction). In the method of FIG. 5a, the controller calculates the width of the sample. The sample is arranged on the sample stage so that the width of the sample extends in the same direction as the width of the irradiated area of the sample. In some embodiments, the sample is arranged so that the width of the sample extends in the direction of the axis of the goniometer about which the detector is configured to rotate (the axial direction).

In a first step 32, the controller receives a signal for causing the controller to carry out a parameter measurement procedure. The parameter measured by the controller is the width of the sample. The controller executes the parameter measurement procedure by controlling the X-ray analysis apparatus to carry out a second, third, and fourth step. The controller then carries out the fifth step.

In the second step 34, the controller sends a signal to the first beam mask component actuator and/or the second beam mask component actuator, causing the first beam mask component and/or the second beam mask component respectively to either remain in the first configuration or move to its first configuration. Then, the controller causes the X-ray source to generate an incident X-ray beam that irradiates the sample. Because the first beam mask component is in the first configuration, the first opening is arranged in the incident X-ray beam path, so that only some of the X-rays from the X-ray source pass through the first beam mask component, towards the sample.

In the third step 36, the controller sends a control signal to the sample stage, causing the sample stage to move the sample in the y-direction, while the sample is irradiated by the X-ray beam. In this example the controller controls the sample stage to move the sample in the y-direction because this is the direction in which the parameter to be measured (the width of the sample) extends. In the third step, the sample is moved so that the beam spot passes over a first edge of the sample.

In the fourth step 38, the sample is moved so that the beam spot passes over a second edge of the sample.

In the fifth step 40, the controller calculates the width of the sample. The width of the sample is measured by detecting the edges of the sample. The edges of the sample are detected by measuring the intensity of X-rays from the sample when the sample is moved to different positions along the y-axis relative to the incident X-ray beam. As a beam spot passes over the edge of the sample (in the width direction) the irradiated width of the sample changes. The irradiated width is the width of the sample that is irradiated by the incident X-ray beam. When the beam spot passes over the edge of the sample, the irradiated width of the sample changes because the proportion of the beam spot irradiating the sample changes. For example, as the beam spot passes over an edge of the sample, the beam spot moves from a position at which the full beam spot irradiates the sample to a position in which part of the beam spot irradiates the sample and part of the beam spot is no longer incident on the sample. Therefore, as the beam spot passes over the edge, the intensity of detected X-rays from the sample decreases.

This is shown in FIG. 5b, which illustrates a method for measuring the width of the sample (i.e. the dimension along the y-direction). All of the central beam spot is incident on the sample, so that a maximum intensity signal is obtained. The beam spots on either side of the central beam spot, which each straddle an edge of the sample, only partly irradiate the sample.

By determining the distance between the positions at which the X-ray intensity changes, it is possible to calculate the width of the sample. In some embodiments, the width of the beam spot is significantly smaller than the width of the sample.

By using a beam having a small width, the change in the intensity of X-rays from the sample, caused by the beam moving across an edge of the sample, is steeper (the normalized intensity changes more quickly with position). Accordingly, using a small beam to measure a dimension of the sample can provide a more accurate measurement. By controlling the configuration of the first beam mask component, it is possible to ensure the beam incident on the sample is relatively small. Preferably, both the first beam mask component and the second beam mask component are in their first configuration, so that both masks limit the size of the beam. In this way, it is possible to accurately measure a dimension of the sample. The configuration of the first beam mask component and/or the second beam mask component can then be changed to allow X-ray analysis measurements to be carried out using a different beam spot to that used to measure the dimension of the sample. In this way, it is possible to conveniently carry out X-ray analysis measurements using any of a number of different analysis techniques. For example, a Bragg Brentano measurement can be carried out by arranging each of the first beam mask component and the second beam mask component in its second configuration.

By determining the positions of the edges of the sample, it is possible to control the position of the sample such that the incident X-ray beam is aligned with the sample so that the incident X-ray beam bisects the sample in the width direction. In some embodiments, the size of the incident beam is controlled to match the width of the sample.

The length of the sample can also be measured, by rotating the sample before repeating the measurement procedure described above.

In an alternative method for measuring the width of the sample, the sample is positioned between the X-ray tube 4 and the X-ray detector 14, and the sample is arranged to block the path of the X-rays from the X-ray source to the detector.

In a first step, the controller receives a signal causing it to carry out a parameter measurement procedure.

In a second step, the controller sends a signal to the first beam mask component actuator and/or the second beam mask component actuator, causing the first beam mask component and/or the second beam mask component respectively to either remain in the first configuration or move to its first configuration. Then, the controller causes the X-ray source to generate an incident X-ray beam that irradiates the sample. Because at least one of the first beam mask component and the second beam mask component is in its first configuration, only some of the X-rays from the X-ray source pass through the first beam mask component, towards the sample.

In the third step, the controller controls the X-ray analysis apparatus to move the sample in a direction parallel to the dimension being measured (e.g. the width of the sample), while the sample is irradiated by the X-ray beam. In the third step, the sample is moved so that the beam spot passes over a first edge of the sample.

In the fourth step 38, the sample is moved so that the beam spot passes over a second edge of the sample.

In the fifth step, the controller calculates the width of the sample. The width of the sample is measured by detecting the edges of the sample. The edges of the sample are detected by measuring the intensity of X-rays from the sample when the sample is moved to different positions along the y-axis relative to the incident X-ray beam. As the beam spot passes over the edge of the sample (in the width direction) the irradiated width of the sample changes. The irradiated width is the width of the sample that is irradiated by the incident X-ray beam. When the beam spot passes over the edge of the sample, the irradiated width of the sample changes because the proportion of the beam spot irradiating the sample changes. For example, as the beam spot passes over an edge of the sample, the beam spot moves from a position at which the full beam spot irradiates the sample to a position in which part of the beam spot irradiates the sample and part of the beam spot is no longer incident on the sample. Because the sample is arranged to prevent X-rays from reaching the X-ray detector, the intensity of detected X-rays from the sample increases as the X-ray beam spot passes over the edge of sample and the irradiated width of the sample decreases.

By determining the distance between the positions at which the X-ray intensity changes, it is possible to calculate the width of the sample. In some embodiments, the width of the beam spot is significantly smaller than the width of the sample.

The length of the sample can also be measured using this method, by rotating the sample in a plane that includes the width and the length of the sample, then repeating the measurement procedure described above.

Figure 6:
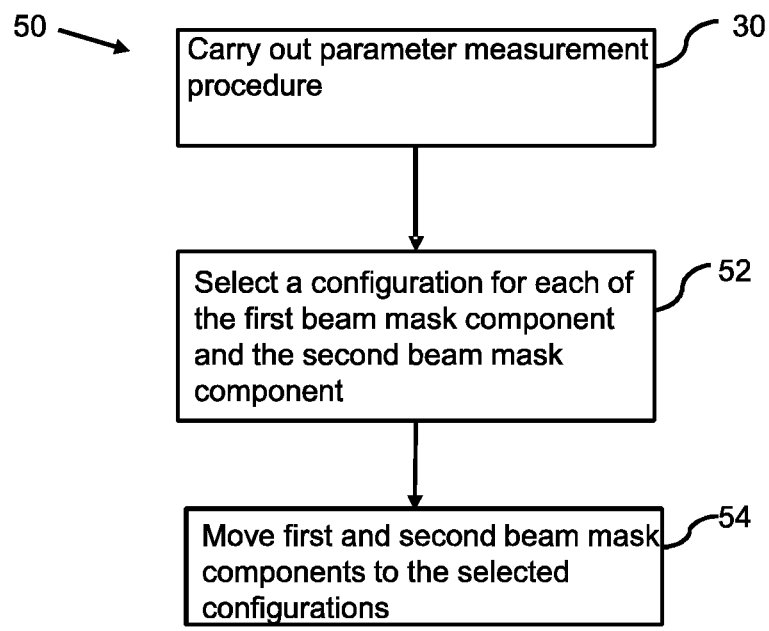
FIG. 6 illustrates a method of using the X-ray analysis apparatus of FIG. 1, according to an embodiment.
Figure 7:
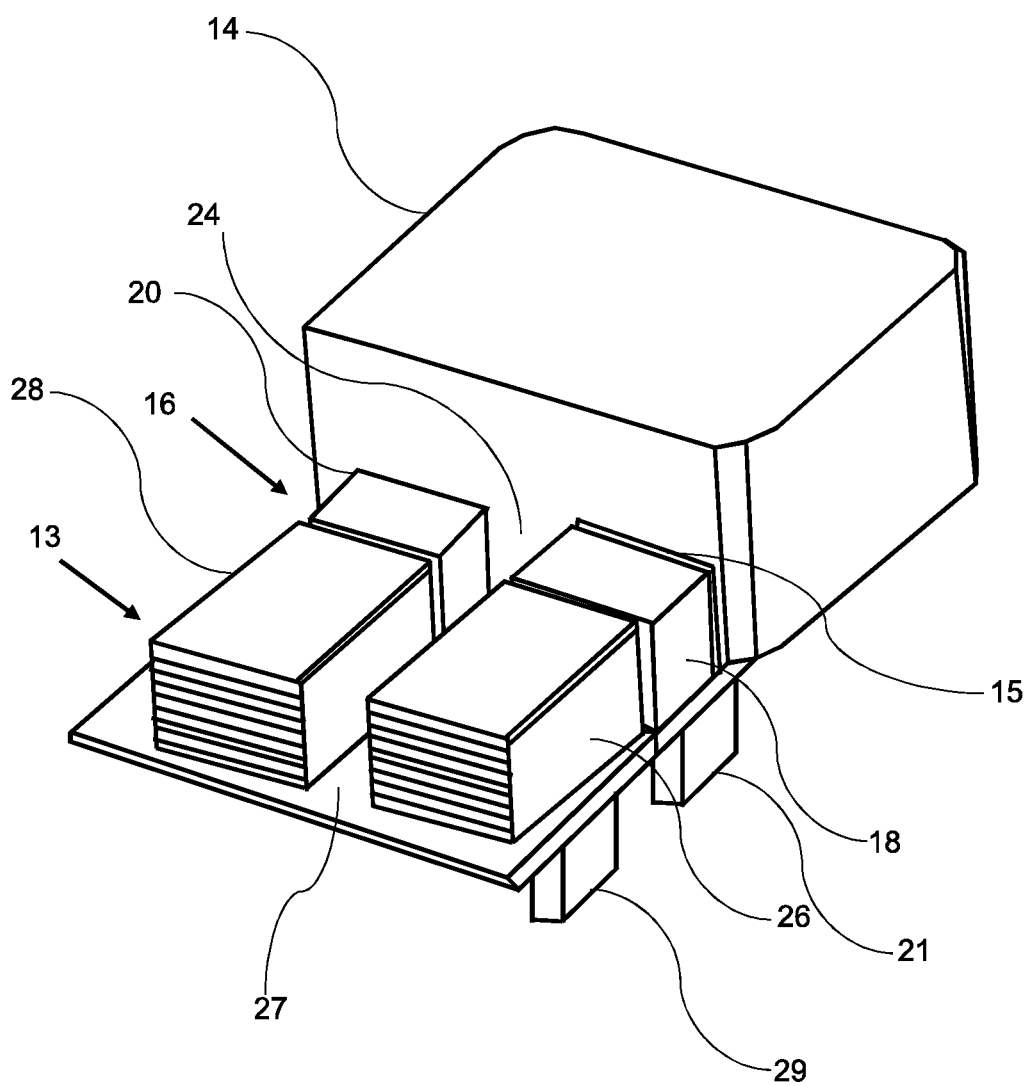
FIG. 7 shows a first collimator and a second collimator of an X-ray analysis apparatus.

FIG. 6 illustrates a method for carrying out an X-ray analysis measurement 50, according to an embodiment of the invention. In the method of FIG. 6, the controller uses the size of sample in the x- or y-direction to select an optimal configuration for the first beam mask component and the second beam mask component, for subsequent X-ray analysis method. Since the first beam mask component and the second beam mask component at least partly determine the width of the sample irradiated by the incident X-ray beam, it is possible to control the width of the sample irradiated by the incident X-ray beam by changing the configurations of the first beam mask component and the second beam mask component.

For each combination of configurations of the first beam mask component and the second beam mask component, there is an associated beam spot width. The beam spot width is the width of the beam spot that irradiates the sample. The beam spot may be larger than the sample, or smaller than the sample. By comparing the width of the beam spot to the width of the sample it is possible to determine whether that combination of openings provides an optimal irradiated width of the sample. By selecting the opening (or combination of openings) that provides(s) an beam spot width that most closely matches the width of the sample, it is possible to reduce parasitic scatter and obtain high quality analysis results.

In a first step 30, the controller sends a signal to the first beam mask component actuator 225 to move the first beam mask component 22 and the second beam mask component 25 to the first configuration. Then, the parameter measurement procedure illustrated in FIG. 5a is carried out. The parameter measurement procedure may be carried out to measure the width of the sample, the length of the sample or both the width and the length of the sample.

In a second step 52, the controller 17 uses the measured parameter to select a configuration of the first beam mask component 22 and the second beam mask component 25. Each combination of openings for the first beam mask component and the second beam mask component has a corresponding irradiated width of the sample. Therefore, in an example, the controller 17 compares the measured parameter to an irradiated width of the sample for each set of configurations. The controller 17 may determine which combination of openings of the first beam mask component 22 and the second beam mask component 25 would cause the incident X-ray beam to irradiate a width of the sample 6 that is most similar in magnitude to the measured width of the sample. In this case, the selected openings might result in a beam size that irradiates some of the sample stage as well as the sample. In some embodiments, the controller 17 may determine which combination of openings would result in a maximum irradiated width of the sample, without irradiating an area outside of the sample.

In a third step 54, the controller 17 sends a signal to the first beam mask component actuator 225 to move the first beam mask component 22 to the configuration selected by the controller 17 in the second step. The controller also sends a signal to the second beam mask component actuator 255 to move the second beam mask component 25 to the configuration selected for the second beam mask component 25 in the second step.

By changing the size of the incident X-ray beam using the first beam mask component 22 and/or the second beam mask component 25, it is possible to minimise parasitic scatter from the X-ray analysis apparatus. In particular, it is possible to minimise parasitic scatter from the sample stage. The controller 17 selects an optimal configuration of the first beam mask component 22 and optionally the second beam mask component 25 based on the width and or length of the sample 6. Accordingly, it is possible to maximise intensity of the X-rays diffracted/scattered by the sample whilst minimising the signal from X-rays that are scattered by the sample stage. In this way, high quality measurement results can be obtained.

This is particularly useful for measuring a plurality of samples in a batch of samples. The samples in the batch may vary in size. As a result using a single beam size for all of the samples in the batch does not provide optimal results. By calculating the size of the sample for each sample in the batch and then selecting the optimal configuration for the first and/or second beam mask for each sample in the batch, it is possible to maximise intensity and minimise parasitic scatter for the measurements carried out on each sample in the batch.

Table 1 shows some exemplary configuration for various components of the X-ray analysis apparatus, according to embodiments of the invention. In a "mask configuration", the relevant beam mask component is configured such that an opening for limiting the divergence of the incident X-ray beam is arranged in the incident X-ray beam path. For example, the first/second beam mask component is in the first configuration, or the third configuration. In the second configuration, the opening does not limit the divergence of the incident X-ray beam, so the second configuration is not a "mask configuration".

TABLE 1

Exemplary X-ray Analysis Configurations for Different X-ray Analysis Methods

| X-ray Analysis Method | First Beam Mask Component | Second Beam Mask Component | First and Second collimators (Soller Slit Collimators) | Third and Fourth Collimators (Parallel Plate Collimators) |
|---|---|---|---|---|
| 2D microdiffraction | Mask configuration | Mask configuration | Both collimators in second configuration | Both collimators in second configuration |
| 1D microdiffraction | Mask configuration | Mask configuration | One of the first collimator and the second collimator in first configuration | Both collimators in second configuration |
| Bragg-Brentano (powder diffraction) | Second configuration | Mask configuration or Second configuration | Both collimators in second configuration or one of the first collimator and the second collimator in first configuration | Both collimators in second configuration |

TABLE 1-continued

Exemplary X-ray Analysis Configurations for Different X-ray Analysis Methods

| X-ray Analysis Method | First Beam Mask Component | Second Beam Mask Component | First and Second collimators (Soller Slit Collimators) | Third and Fourth Collimators (Parallel Plate Collimators) |
|---|---|---|---|---|
| Phase analysis on rough surfaces | Second configuration | Mask configuration or second configuration | One of the first collimator and the second collimator in first configuration | One of the third collimator and the fourth collimator in first configuration |
| SAXS | Attenuator portion arranged in incident beam path (for low angles only) | Second configuration | Both collimators in second configuration | Both collimators in second configuration |
| Reflectometry | Attenuator portion arranged in incident beam path (for low angles only) | Second Configuration | One of the first collimator and the second collimator in the first configuration | Both collimators in second configuration |
| Thin film phase analysis | Second configuration | Mask configuration or second configuration | One of the first collimator and the second collimator in first configuration | One of the third collimator and the fourth collimator in first configuration |
| Topography | Second configuration | Mask configuration | Both collimators in second configuration | Both collimators in second configuration |
| GISAXS | Mask configuration | Mask configuration | Both collimators in second configuration | Both collimators in second configuration |
| Stress | Mask configuration or Second configuration | Mask configuration or Second configuration | Both collimators in second configuration or one of the first collimator and the second collimator in first configuration | Both collimators in second configuration or one of the third collimator and the fourth collimator in first configuration |
| Texture | Mask configuration or Second configuration | Mask configuration or Second configuration | Both collimators in second configuration or one of the first collimator and the second collimator in first configuration | Both collimators in second configuration |

TABLE 2

Exemplary X-ray Analysis Configurations for Different X-ray Analysis Methods

| X-ray Analysis Method | Programmable Divergence Slit | Programmable Anti-Scatter Slit | Detector |
|---|---|---|---|
| 2D microdiffraction | Small opening | Open | 2D Mode |
| 1D microdiffraction | Small opening | Open | 1D Mode |
| Bragg-Brentano (powder diffraction) | Controlled opening | Controlled opening | 1D Mode |
| Phase analysis on rough surfaces | Small Opening or Wide Opening | Open | 0D Mode |
| SAXS | Small Opening | Small Opening | Small active area |
| Reflectometry | Small Opening | Small Opening | Small active area |
| Thin film phase analysis | Small Opening | Open | 0D Mode |
| Topography | Small Opening or Wide Opening | Open | 2D Mode |
| GISAXS | Small Opening | Open | 2D Mode |
| Stress | Depends on Sample Area | Open | 1D/2D/0D Mode |
| Texture | Depends on Sample Area | Open | 1D/2D/0D Mode |

In any of the methods described above, the controller may be configured to normalise the measured intensity to produce a normalised intensity, based on information about the components of the X-ray analysis apparatus. The controller carries out a normalisation calculation by normalising the intensity according to the incident angle for which it was measured, or to normalise the measured intensity according to the configuration of the first beam mask component and optionally the second beam mask component. In particular, the controller is configured to normalise the measured intensity according to the width of the opening(s) arranged in the incident X-ray beam path.

This normalisation may be performed by the controller 17. Instead, the normalisation can be carried out by a different entity, such as a processor (not shown). In this case, the processor preferably receives information about the angle of the incident X-ray beam and/or the configuration of the first beam mask component and optionally the second beam mask component, together with the measured intensity to be normalised.

The skilled person will understand that the X-ray detector can be any type of X-ray detector. For example, the X-ray detector is a 2D detector that can be operated in a 2D mode, a 1D mode or a 0D mode. For Bragg Brentano measurements, the 1D mode is typically used. For SAXS measurements and Reflectometry measurements, only a few channels of the X-ray detector are active.

In some embodiments, the X-ray analysis apparatus does not include a beam conditioning unit.

In some embodiments, the controller is configured to calculate the length of the sample. To measurement the length of the sample, the same procedure shown in FIG. 5a and FIG. 5b is carried out, but the sample stage is controlled to move in the x-direction.

In some embodiments, the X-ray analysis apparatus does not include a second beam mask component. In these embodiments, the controller is configured to select the configuration of the first beam mask component by determining the irradiated width of the sample for different configurations of the first beam mask component.

The first beam mask component and the second beam mask component may not be round, but may instead be slightly rounded or may be rectangular or any other shape.

In some embodiments, the second beam mask component 25 comprises at least the same set of openings as the first beam mask component. In other embodiments, the second beam mask component comprises additional openings or a different set of openings to the first beam mask component.

The invention claimed is:

1. An X-ray analysis apparatus (2), comprising:
an X-ray source (4) for generating X-rays;
a sample stage (8) configured to support a sample (6), the X-ray source and the sample stage being arranged so that X-rays generated by the X-ray source define an incident X-ray beam (12) that irradiates the sample, wherein the incident X-ray beam is directed from the X-ray source to the sample along an incident X-ray beam path;
a first beam mask component (22) arranged between the X-ray source (4) and the sample (6), in the incident X-ray beam path, wherein the first beam mask component (22) comprises a body (220), a first opening (222) for limiting the size and/or divergence of the incident X-ray beam and a second opening (224);
wherein the first beam mask component (22) has a first configuration of the first beam mask component and a second configuration of the first beam mask component, wherein in the first configuration of the first beam mask component:
the first opening (222) is arranged in the incident X-ray beam path so as to limit the size and/or divergence of the incident X-ray beam and the second opening (224) is arranged outside of the incident X-ray beam path, and
in the second configuration of the first beam mask component:
the second opening (224) is arranged in the incident X-ray beam path, and the body (220) and the first opening (222) are arranged outside of the incident X-ray beam path; and
the X-ray analysis apparatus further comprises a controller (17) configured to control a first beam mask component actuator (225) to change the configuration of the first beam mask component (22) between its first configuration and its second configuration by moving the first beam mask component (22) in a plane intersected by the incident X-ray beam.

2. The X-ray analysis apparatus (2) of claim 1, further comprising:
a second beam mask component (25) arranged between the first beam mask component (22) and the sample (6), the second beam mask component (25) comprising a body (250), a first opening (252) for limiting the size and/or divergence of the incident X-ray beam and a second opening (254);
the second beam mask component (25) having a first configuration of the second beam mask component and a second configuration of the second beam mask component, wherein in the first configuration of the second beam mask component:
the first opening (252) is arranged in the incident X-ray beam path and the second opening (254) is arranged outside of the incident X-ray beam path, and
in the second configuration of the second beam mask component:
the second opening (254) is arranged in the incident X-ray beam path, and the body (250) and the first opening (252) are arranged outside of the incident X-ray beam path; and
wherein the controller (17) is configured to control a second beam mask component actuator (255) to change the configuration of the second beam mask component (25) between its first configuration and its second configuration by moving the second beam mask component (25) in a plane intersected by the incident X-ray beam.

3. The X-ray analysis apparatus of claim 2 wherein the controller (17) is configured to control the first beam mask component actuator (225) and the second beam mask component actuator (255) to move the first beam mask component (22) and the second beam mask component (25) respectively between any two of a first measurement mode, a second measurement mode, a third measurement mode, and a fourth measurement mode wherein:
in the first measurement mode, the first beam mask component (22) is in its first configuration and the second beam mask component (25) is in its first configuration;
in the second measurement mode, the first beam mask component (22) is in its first configuration and the second beam mask component (25) is in its second configuration; and
in the third measurement mode, the first beam mask component (22) is in its second configuration and the second beam mask component (25) is in its second configuration; and
in a fourth measurement mode, the first beam mask component (22) is in its second configuration and the second beam mask component (25) is in its first configuration.

4. The X-ray analysis apparatus (2) of claim 2 wherein the first beam mask component (22) is moveable between its first configuration and its second configuration by rotating the first beam mask component (22), and wherein the second beam mask component (25) is moveable between its first configuration and its second configuration by rotating the second beam mask component (25).

5. The X-ray analysis apparatus of claim 2 wherein the first beam mask component (22) comprises at least two openings for limiting the size and/or divergence of the incident X-ray beam and wherein the second beam mask component (25) comprises at least two openings for limiting the size and/or divergence of the incident X-ray beam.

6. The X-ray analysis apparatus (2) of claim 2 wherein the first beam mask component (22) and/or the second beam mask component (25) is arranged to move in a plane substantially perpendicular to the incident X-ray beam.

7. The X-ray analysis apparatus of claim 2, wherein the controller is configured to calculate a parameter relating to a dimension of the sample and to change the configuration of the first beam mask component and/or the second beam mask component (25) based on the calculated parameter.

8. The X-ray analysis apparatus of claim 7, wherein the X-ray analysis apparatus further comprises an X-ray detector (14), and the controller (17) is configured to carry out a parameter calculation procedure to calculate a first dimension of the sample (6) by:
  controlling the X-ray analysis apparatus (2) to move the sample (6) relative to the incident X-ray beam;
  detecting a first edge of the sample by detecting a first change in the intensity of the X-rays;
  detecting a second edge of the sample by detecting a second change in the intensity of X-rays; and
  calculating the first dimension of the sample by calculating the distance between the first edge and the second edge.

9. The X-ray analysis apparatus (2) of claim 8, wherein the controller (17) is configured to control the first beam mask component actuator (225) to move the first beam mask component (22) to its first configuration before carrying out the parameter calculation procedure and to control the second beam mask component actuator (255) to move the second beam mask component (25) to its first configuration before carrying out the parameter calculation procedure.

10. The X-ray analysis apparatus of claim 9 wherein the controller (17) is configured to:
  control the first beam mask component actuator (225) to move the first beam mask component (22) to its second configuration after carrying out the parameter calculation procedure; and
  control the second beam mask component actuator (255) to move the second beam mask component (25) to its second configuration after carrying out the parameter calculation procedure.

11. The X-ray analysis apparatus of claim 1, wherein the controller (17) is configured to calculate a parameter relating to a dimension of the sample and to change the configuration of the first beam mask component (22).

12. The X-ray analysis apparatus (2) of claim 1 further comprising a camera arranged to image the sample, wherein the controller (17) is configured to:
  control the camera to take an image of the sample (6); and
  analyse the image of the sample to calculate a dimension of the sample.

13. The X-ray analysis apparatus (2) of claim 1 further comprising an adjustable divergence slit (9) for limiting the divergence of the incident X-ray beam, wherein the adjustable divergence slit is arranged in the incident X-ray beam path, and wherein the controller (17) is configured to control the opening of the adjustable divergence slit (9).

14. An X-ray analysis apparatus (2), comprising:
  an X-ray source (4) for generating X-rays;
  a sample stage (8) configured to support a sample (6), the X-ray source and the sample stage being arranged so that X-rays generated by the X-ray source define an incident X-ray beam (12) that irradiates the sample, wherein the incident X-ray beam is directed from the X-ray source to the sample along an incident X-ray beam path;
  a first beam mask component (22) arranged between the X-ray source (4) and the sample (6), in the incident X-ray beam path, wherein the first beam mask component (22) comprises a body (220), a first opening (222) for limiting the size and/or divergence of the incident X-ray beam and a second opening (224);
  wherein the first beam mask component (22) has a first configuration of the first beam mask component and a second configuration of the first beam mask component, wherein in the first configuration of the first beam mask component:
    the first opening (222) is arranged in the incident X-ray beam path so as to limit the size and/or divergence of the incident X-ray beam and the second opening (224) is arranged outside of the incident X-ray beam path, and
  in the second configuration of the first beam mask component:
    the second opening (224) is arranged in the incident X-ray beam path, and the body (220) and the first opening (222) are arranged outside of the incident X-ray beam path; and
  a controller (17) configured to control a first beam mask component actuator (225) to change the configuration of the first beam mask component (22) between its first configuration and its second configuration by moving the first beam mask component (22) in a plane intersected by the incident X-ray beam and to calculate a parameter relating to a dimension of the sample and to change the configuration of the first beam mask component (22); and
  an X-ray detector (14), and wherein the controller (17) is configured to carry out a parameter calculation procedure to calculate a first dimension of the sample (6) by:
    controlling the X-ray analysis apparatus (2) to move the sample (6) relative to the incident X-ray beam;
    detecting a first edge of the sample by detecting a first change in the intensity of the X-rays;
    detecting a second edge of the sample by detecting a second change in the intensity of X-rays;
  calculating the first dimension of the sample by calculating the distance between the first edge and the second edge.

15. The X-ray analysis apparatus (2) of claim 14 wherein the X-ray detector (14) is arranged to receive X-rays from the sample and comprises an adjustable slit (11) arranged between the sample (6) and the X-ray detector (14), wherein the controller (17) is configured to control the opening of the adjustable slit (11).

16. The X-ray analysis apparatus (2) of claim 15 wherein the controller (17) is configured to control the opening of the adjustable slit (11) based on the dimension of the sample calculated by the controller (17).

17. The X-ray analysis apparatus (2) of claim 14, wherein the controller (17) is configured to carry out a second parameter measurement procedure to calculate a second dimension of the sample, wherein the second parameter measurement procedure comprises:
controlling the X-ray analysis apparatus (2) to rotate the sample from a first position to a second position;
controlling the X-ray analysis apparatus (2) to move the sample (6) relative to the incident X-ray beam, in a direction substantially parallel to the second dimension;
detecting a third edge of the sample by detecting a first change in the intensity of X-rays;
detecting a fourth edge of the sample by detecting a second change in the intensity of X-rays;
calculating the second dimension of the sample by calculating the distance between the third edge and the fourth edge;
controlling the X-ray analysis apparatus (2) to rotate the sample from the second position to the first position.

18. A method of using an X-ray analysis apparatus (2), comprising carrying out a parameter calculation procedure (30) by:
moving a sample (6) relative to an incident X-ray beam;
detecting a first edge of the sample (6) by detecting a first change in the intensity of X-rays;
detecting a second edge of the sample (6) by detecting a second change in the intensity of X-rays;
calculating a dimension of the sample by calculating the distance between the first edge and the second edge,
wherein the X-ray analysis apparatus comprises:
an X-ray source (4) for generating X-rays;
a sample stage (8) configured to support the sample (6), the X-ray source and the sample stage being arranged so that X-rays generated by the X-ray source define the incident X-ray beam (12) that irradiates the sample, wherein the incident X-ray beam is directed from the X-ray source to the sample along an incident X-ray beam path;
a first beam mask component (22) arranged between the X-ray source (4) and the sample (6), in the incident X-ray beam path, wherein the first beam mask component (22) comprises a body (220), a first opening (222) for limiting the size and/or divergence of the incident X-ray beam and a second opening (224);
wherein the first beam mask component (22) has a first configuration of the first beam mask component and a second configuration of the first beam mask component, wherein in the first configuration of the first beam mask component:
the first opening (222) is arranged in the incident X-ray beam path so as to limit the size and/or divergence of the incident X-ray beam and the second opening (224) is arranged outside of the incident X-ray beam path, and
in the second configuration of the first beam mask component:
the second opening (224) is arranged in the incident X-ray beam path, and the body (220) and the first opening (222) are arranged outside of the incident X-ray beam path; and the X-ray analysis apparatus further comprises a controller (17) configured to control a first beam mask component actuator (225) to change the configuration of the first beam mask component (22) between its first configuration and its second configuration by moving the first beam mask component (22) in a plane intersected by the incident X-ray beam.

19. The method of claim 18, further comprising controlling the X-ray analysis apparatus to adjust the opening of an adjustable slit (11), based on the dimension calculated by the controller.

20. The method of claim 18, further comprising controlling the X-ray analysis apparatus to adjust the opening of an adjustable divergence slit (9), based on the first dimension and/or a second dimension calculated by the controller.

21. The method of claim 18, wherein the X-ray analysis apparatus (2) further comprises:
a second beam mask component (25) arranged between the first beam mask component (22) and the sample (6), the second beam mask component (25) comprising a body (250), a first opening (252) for limiting the size and/or divergence of the incident X-ray beam and a second opening (254);
the second beam mask component (25) having a first configuration of the second beam mask component and a second configuration of the second beam mask component, wherein in the first configuration of the second beam mask component:
the first opening (252) is arranged in the incident X-ray beam path and the second opening (254) is arranged outside of the incident X-ray beam path, and
in the second configuration of the second beam mask component:
the second opening (254) is arranged in the incident X-ray beam path, and the body (250) and the first opening (252) are arranged outside of the incident X-ray beam path; and
wherein the controller (17) is configured to control a second beam mask component actuator (255) to change the configuration of the second beam mask component (25) between its first configuration and its second configuration by moving the second beam mask component (25) in a plane intersected by the incident X-ray beam.

22. The method of claim 21, further comprising, after carrying out the parameter calculation procedure, positioning the second beam mask component (25) in its second configuration.

23. The method of claim 21, further comprising, after carrying out the parameter calculation procedure, selecting a first beam mask component (22) configuration based on the calculated parameter and positioning the first beam mask component (22) in its selected configuration, and selecting a second beam mask component (25) configuration based on the parameter and positioning the second beam mask component (25) in its selected configuration.

* * * * *